Jan. 16, 1968    S. B. WHEELER    3,363,463
MEANS OF DIRECTIONALLY SENSING FLOW
Filed Feb. 15, 1965
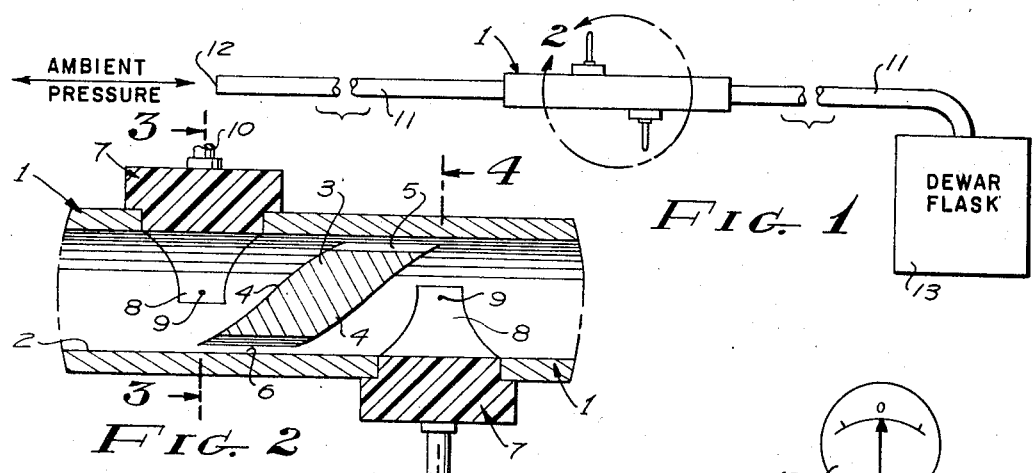
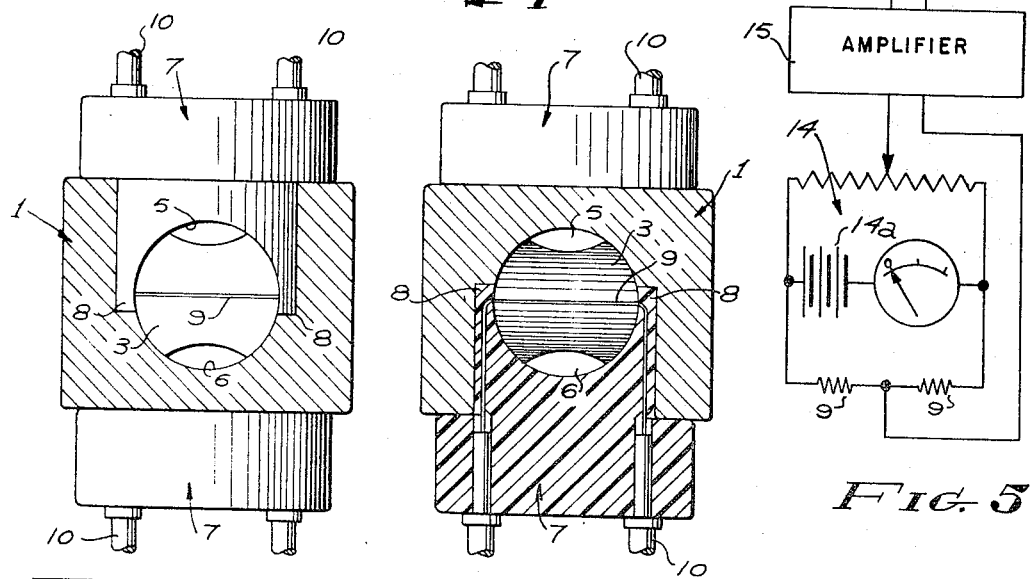
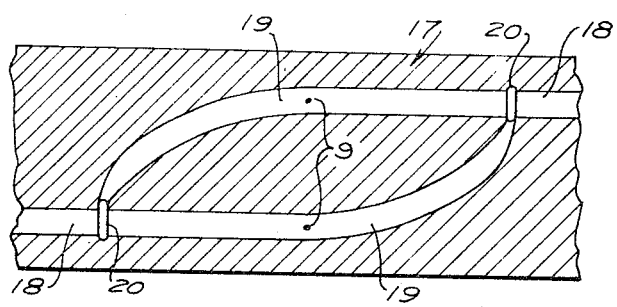
INVENTOR.
SAMUEL B. WHEELER
BY
Lyon + Lyon
ATTORNEYS

United States Patent Office 3,363,463
Patented Jan. 16, 1968

3,363,463
MEANS OF DIRECTIONALLY SENSING FLOW
Samuel B. Wheeler, Monrovia, Calif., assignor to California Institute Research Foundation, Pasadena, Calif., a corporation of California
Filed Feb. 15, 1965, Ser. No. 432,690
5 Claims. (Cl. 73—204)

ABSTRACT OF THE DISCLOSURE

A means of sensing flow in either direction in a conduit, in which a divider body forms constricted, diametrically opposed flow passages with a surrounding conduit and is provided at opposite axial ends with angularly disposed diverting faces which funnel substantially all the flow from the upstream side into one channel and creates a dead fluid space at the downstream side of the divider. Heated sensing wires detect the direction and intensity of fluid flow.

This invention relates to means and method of directionally sensing flow.

Included in the objects of this invention are:

First, to provide a means and method whereby a transient flow of a small volume of fluid is employed to indicate sudden pressure changes of low magnitude, and to indicate, by determining the direction of flow, whether the pressure change is positive or negative.

Second, to provide a means for detecting transient flow which does not involve any moving parts, the pressure detecting means utilizing a flow passage interrupted by a divided portion so arranged that flow in one direction favors one branch of the divided portion, whereas flow in the opposite direction favors the other branch thereof, and wherein flow detecting elements are disposed in each branch.

Third, to provide a means and method of this class which has a wide range of application; such as, but not limited to, the detection of sudden but minute changes in barometric pressure or in aircraft altitude; the detection of variations in flow in the air ducts or the rooms of buildings having forced air heating or cooling systems; or the detection of shock waves or pulsations of low magnitude.

Fourth, to provide a means and method of this class which has application in the measurement and detection of the respiration and breathing characteristics of patients.

Fifth, to provide a means and method which, while primarily adapted for detection of minute flow pulses and corresponding pressure changes, is capable of detecting, without damage, flow pulses or pressure changes of high magnitude.

With the above and other objects in view as may appear hereinafter, reference is directed to the accompanying drawings in which:

FIGURE 1 is a diagrammatical view showing one form of the means for detecting pressure changes.

FIGURE 2 is an enlarged fragmentary sectional view taken within circle 2 of FIGURE 1.

FIGURE 3 is an enlarged transverse sectional view taken through 3—3 of FIGURE 2.

FIGURE 4 is a similar enlarged transverse sectional view taken through 4—4 of FIGURE 2.

FIGURE 5 is a circuit diagram illustrating one type of circuit which may be employed in conjunction with the means for detecting pressure changes.

FIGURE 6 is a diagrammatical sectional view illustrating another form of the means for detecting pressure changes.

Reference is first directed to FIGURES 1 through 4. The construction here illustrated involves a flow sensing unit including body member 1, having a bore 2 therethrough.

Positioned in the bore 2 at its central portion is a flow divider 3 in the form of a disc having axially sloping end faces 4 of attenuated S-form. The axially displaced diametrically opposite sides of the flow divider are provided with grooves which form, with the confronting walls of the bore 2, axially directed ports 5 and 6.

At each side of the flow divider 3, the bore 2 is intersected by a mounting plug 7, the inner ends of which are curved in conformity with the walls of the bore 2 to form diametrically disposed arms 8. A resistance wire 9 extends between the arms of each mounting plug. The extremities of each resistance wire extend outwardly through the mounting plug and are joined to terminals 10.

One arrangement for utilizing the transient flow detecting means includes a conduit 11 in which the body member 1 of the flow detecting unit is interposed.

One end of the conduit designated 12 is open to ambient pressure. The other end of the conduit is joined to a relatively large container 13 which is essentially an accumulator. In some instances, where temperature stability is important, it is desirable that the container be thermally insulated and thus function as a Dewar flask.

The resistance wires 9 may be employed in various types of conventional detecting amplifier and recording circuits. For purposes of illustration, the resistance wires are shown in FIGURE 5 as incorporated in a bridge circuit 14. A battery 14a or other means is provided to heat the resistance elements. The output from the bridge circuit is fed to an amplifier 15. The output of the amplifier is shown as supplied to a meter 16 having a null-central point although more conventional elaborate indicating or recording means may be used.

Operation of the means for detecting transient flow as illustrated in FIGURES 1 through 5 is as follows:

If the body member 1 is located in a conduit 11, as illustrated in FIGURE 1, so that one end 12 of the conduit is exposed to ambient air pressure and the other end terminates in a container 13, slight changes in the ambient pressure will cause a flow of air to or from the container 13.

The fluid, when flowing to the right, as viewed in FIGURES 1 and 2, flows around and alters the temperature, and hence the resistance, of the left hand resistance wire 9. The right hand resistance wire is essentially unaffected, as the limited region downstream of the flow divider constitutes a dead air space. Conversely, when the flow occurs in the opposite direction, the upstream resistance wire is more affected by the air flow than the downstream resistance wire.

The effect of a change in pressure is of relatively short duration and is dependent on the volumetric capacity of the container 13; that is, a momentary flow occurs and terminates when the system comes into equilibrium.

The instrument thus serves to indicate the change in resistance of one or the other of the sensors 9, which direction a minute flow is moving, thus indicating in the arrangement shown in FIGURE 1, a transient increase or decrease in pressure at the intake end 1. Also by noting the magnitude of the transient change in resistance in either sensor 9, the magnitude of the pressure change may be determined.

It will be observed that relatively slow changes in ambient pressure have little effect. In some instances the effect of change in temperature in the container 13 may mask the pressure change to be measured. This condition is minimized by utilizing a thermally insulated container, such as a Dewar flask.

It should be noted that the means for detecting sudden pressure changes may be quite small; for instance, the bore of the body member may be in the range of ⅛″ in diameter. This dimension is used for illustration and is not a limiting dimension.

Reference is directed to FIGURE 6 which illustrates a body member 17 having flow passages 18, including overlapping portions 19, which form divided paths corresponding to the ports 5 and 6. Each overlapping portion curves toward the mating flow passage and joins at right angles thereto, preferably through an annular connection channel 20. With this arrangement, the major portion of the flow from the upstream flow passage bridges the upstream connecting channel and enters the other flow passage through the downstream connecting passage.

Resistance wires 9 are placed in the overlapping portions 19 to sense in which direction the fluid is moving in the flow passages. It will thus be seen that the operation of the modified structure is essentially the same as the first described structure.

While for convenience of illustration, the passages 18 are shown in a common body member, they may be formed by separate sections of tubing joined together in overlapping relation.

It should be observed that, while the apparatus has many applications in which one end of the flow sensing unit is exposed to atmosphere, it may also be utilized in closed systems. In this case, the pressures involved need not be in reference to atmospheric pressure and the fluids may be other than air. In all cases, however, the flow sensing unit is connected to a region wherein transient condition causes flow into or out of the unit in one direction or the other through the flow sensing unit.

It should also be observed that, while the apparatus is capable of measuring extremely small flow and correspondingly small changes in pressure, it is capable of withstanding, as well as measuring without damage, high and sudden flow and correspondingly large pressure changes.

It should be observed that while the sensing means are shown as resistance wires, other sensing means may be used such as thermally sensitive resistors, commonly known as "thermal-resistors," or semiconductors may be used.

The method of detecting transient flow changes consists essentially in exposing one end of a conduit to regions of ambient or variable pressure and connecting the other end to a closed chamber; then detecting flow into or out of the chamber caused by change in ambient or variable pressure.

The method includes more specifically the detection of the direction of flow; that is, whether the flow is into or out of the chamber to indicate increase or decrease in ambient pressure.

I claim:
1. Means for detecting the direction of transient fluid flow, comprising:
    (a) a conduit exposed to transient fluid flow in either direction therethrough;
    (b) a divider having faces disposed angularly in said conduit to define an acute angle juncture and an obtuse angle juncture with diametrically opposite sides of said conduit, each of said diverting faces defining an attenuated S-shape, forming a convex portion adjacent the acute angle juncture and a concave portion adjacent the obtuse angle juncture, thereby to facilitate nonturbulent flow;
    (c) said divider also defining with said conduit a pair of axially elongated flow passages of uniform relatively small cross sectional area, each connecting the apices of an acute angle juncture and an obtuse angle juncture;
    (d) each angular face, when constituting the upstream end of said divider, adapted to divert essentially all the fluid toward the acute angle juncture for downstream flow in the corresponding flow passage, whereby no appreciable flow occurs through the other flow passage, and a dead fluid space is established downstream of the divider;
    (e) a pair of axially spaced sensing wires extending across said conduit, one on each side of said divider and spaced from each face thereof for exposure to the flowing fluid upstream of said divider and isolated from the flowing fluid downstream of said divider by said dead fluid;
    (f) and means for detecting the effect of flowing fluid on said sensing wires.

2. Means for detecting the direction of transient fluid flow, comprising:
    (a) a conduit exposed to transient fluid flow in either direction therethrough;
    (b) a divider of essentially parallelogram profile in side aspect, defining two acute angle corners and two obtuse angle corners;
    (c) each of two opposed sides of said divider having a channel therein forming, with the confronting wall of said conduit, a relatively elongated flow passage, said divider fitting sealingly in said conduit except for said channels;
    (d) the remaining two sides of said divider acutely transversing the longitudinal axis of said conduit and forming deflecting faces for directing impinging fluid toward the end of said face forming an acute angle with said conduit wall and into the corresponding flow passage;
    (e) a pair of axially spaced sensing elements, one on each side of said divider and spaced from each face thereof for exposure to the flowing fluid upstream of said divider and isolated from the flowing fluid downstream of said divider by said dead fluid;
    (f) and means for detecting the effect of flowing fluid on said sensing elements.

3. A detecting means, as defined in claim 2, wherein:
    (a) each of said deflecting faces defines an attenuated S-shape.

4. A detecting means, as defined in claim 2, wherein:
    (a) said sensing elements are wires extending transversely across said conduit and are approximately in planes traversing said conduit and intersecting the acute angle corners of said parallelogram.

5. A detecting means, as defined in claim 2, wherein:
    (a) said conduit is circular in cross section and said flow channels have corresponding transverse curvature, whereby said flow passages are lens shaped in cross section.

References Cited

UNITED STATES PATENTS

| 1,265,775 | 5/1918 | Hadaway | 73—204 |
| 2,214,181 | 9/1940 | Rylsky | 73—179 |
| 2,509,889 | 5/1950 | Shockley | 73—179 |
| 3,147,618 | 9/1964 | Benson | 73—204 |

FOREIGN PATENTS

| 479,282 | 2/1938 | Great Britain. |
| 905,550 | 4/1945 | France. |

RICHARD C. QUEISSER, *Primary Examiner.*

JAMES J. GILL, *Examiner.*

EDWARD GILHOOLY, *Assistant Examiner.*